US012807128B2

(12) United States Patent
Gosala et al.

(10) Patent No.: US 12,807,128 B2
(45) Date of Patent: Nov. 24, 2026

(54) SYSTEMS AND METHODS FOR ONLINE POWER MANAGEMENT FOR HYBRID POWERTRAINS

(71) Applicant: Cummins Inc., Columbus, IN (US)

(72) Inventors: Dheeraj B. Gosala, Columbus, IN (US); Carlos A. Lana, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/205,907

(22) Filed: Jun. 5, 2023

(65) Prior Publication Data

US 2023/0322200 A1 Oct. 12, 2023

Related U.S. Application Data

(63) Continuation of application No. 16/935,346, filed on Jul. 22, 2020, now Pat. No. 11,702,059.

(51) Int. Cl.
*B60W 20/00* (2016.01)

(52) U.S. Cl.
CPC ..... *B60W 20/00* (2013.01); *B60W 2510/0657* (2013.01); *B60W 2510/18* (2013.01); *B60W 2510/244* (2013.01); *Y02T 10/62* (2013.01)

(58) Field of Classification Search
CPC ......... B60W 20/00; B60W 2510/0638; B60W 2510/0657; B60W 2510/0666; B60W 20/10; B60W 2510/0623
See application file for complete search history.

(56) References Cited

U.S. PATENT DOCUMENTS 4,932,374 A * 6/1990 Klomp .................. F02M 67/02 123/298
5,259,186 A * 11/1993 Snow ........................ F02C 9/26 60/39.281

(Continued)

FOREIGN PATENT DOCUMENTS

CN 105035077 A 11/2015
DE 102007043607 A1 3/2009

(Continued)

OTHER PUBLICATIONS

Lasocki, Jakob. Artur Kopczynski, Pawel Krawczyk, and Pawel Roszcyk. "Empirical Study on the Efficiency of an LPG-Supplied Range Extender for Electric Vehicles". Sep. 13, 2019. Energies. vol. 12 (Issue No. 18). Article No. 3258. <https://doi.org/10.3390/en12183528> (Year: 2019).*

(Continued)

*Primary Examiner* — Logan M Kraft
*Assistant Examiner* — Joshua Campbell
(74) *Attorney, Agent, or Firm* — Taft Stettinius & Hollister LLP

(57) ABSTRACT

At least some embodiments of the present disclosure are directed to systems and methods of online power management for hybrid powertrains. In some embodiments, the hybrid powertrain control system is configured to conduct a brake-thermal-efficiency (BTE) estimation procedure when the powertrain is in operation by operating the hybrid powertrain at a plurality of speeds for a plurality of designated power levels and select certain BTE operating conditions to update the power management.

23 Claims, 8 Drawing Sheets

(56) References Cited

U.S. PATENT DOCUMENTS

| | | | | |
|---|---|---|---|---|
| 6,952,923 | B2 * | 10/2005 | Branyon | F02B 33/44 123/70 R |
| 8,090,520 | B2 | 1/2012 | Tate et al. | |
| 9,115,665 | B2 | 8/2015 | Syed et al. | |
| 11,702,059 | B2 | 7/2023 | Gosala et al. | |
| 2003/0004031 | A1 * | 1/2003 | Philips | B60W 10/02 903/917 |
| 2009/0150016 | A1 | 6/2009 | Hung et al. | |
| 2010/0304926 | A1 * | 12/2010 | Soliman | B60W 10/02 701/113 |
| 2011/0114058 | A1 | 5/2011 | Cohn et al. | |
| 2011/0136625 | A1 * | 6/2011 | Yu | B60W 10/06 903/902 |
| 2011/0178654 | A1 * | 7/2011 | Bauerle | H01M 10/42 701/2 |
| 2014/0331963 | A1 | 11/2014 | Grant et al. | |
| 2015/0300239 | A1 * | 10/2015 | Ruby | F01P 11/14 701/99 |
| 2015/0302670 | A1 * | 10/2015 | Ulrey | B60W 40/00 701/123 |
| 2015/0307080 | A1 | 10/2015 | Miwa et al. | |
| 2015/0330500 | A1 * | 11/2015 | Sujan | F16H 61/0213 701/55 |
| 2015/0344024 | A1 * | 12/2015 | Hayakawa | B60W 20/30 701/53 |
| 2015/0345621 | A1 * | 12/2015 | Sujan | F16H 59/74 701/58 |
| 2015/0361915 | A1 * | 12/2015 | Sujan | B60W 30/1882 701/54 |
| 2017/0276655 | A1 | 9/2017 | Li | |
| 2020/0191075 | A1 * | 6/2020 | Szczepanski | F02D 13/06 |
| 2022/0024437 | A1 | 1/2022 | Gosala et al. | |

FOREIGN PATENT DOCUMENTS

| | | | | |
|---|---|---|---|---|
| EP | 3556627 | A1 | | 10/2019 |
| GB | 2498533 | A | | 7/2013 |
| JP | 2013077051 | A | * | 4/2013 |
| JP | 2015-174491 | A | | 10/2015 |
| WO | 2008/059337 | A2 | | 5/2008 |
| WO | 2017/184492 | A1 | | 10/2017 |

OTHER PUBLICATIONS

European Search Report and Written Opinion for European Patent Application No. EP 21173003, mailed Oct. 13, 2021.

Lasocki Jakub et al, "Empirical Study on the Efficiency of an LPGSupplied Range Extender for Electric Vehicles," Energies, vol. 12, No. 18, Sep. 13, 2019 (Sep. 13, 2019), p. 3528.

* cited by examiner

| Brake Power | Speed | Torque | Sample BTE [%] | | |
|---|---|---|---|---|---|
| kW | RPM | Nm | Day 1 | Day 2 | Day 3 |
| 50 | 1000 | 477 | 24 | 26 | 25 |
| 50 | 2000 | 239 | 25 | 28 | 25 |
| 50 | 3000 | 159 | 28 | 32 | 28 |
| 50 | 4000 | 119 | 28 | 30 | 29 |
| ... | ... | ... | ... | ... | ... |
| ... | ... | ... | ... | ... | ... |
| 100 | 1000 | 955 | 34 | 33 | 38 |
| 100 | 2000 | 477 | 40 | 34 | 35 |
| 100 | 3000 | 318 | 37 | 38 | 35 |
| 100 | 4000 | 239 | 35 | 36 | 37 |

FIG. 3A

| Power Level | Selected Operating Condition | | |
|---|---|---|---|
| kW | Day 1 | Day 2 | Day 3 |
| 50 | 1800 rpm<br>265 Nm | 2000 rpm<br>239 Nm | 1000 rpm<br>477 Nm |
| ... | ... | ... | ... |
| ... | ... | ... | ... |
| 100 | 2000 rpm<br>477 Nm | 3000 rpm<br>318 Nm | 2300 rpm<br>415 Nm |

FIG. 3D

SYSTEMS AND METHODS FOR ONLINE POWER MANAGEMENT FOR HYBRID POWERTRAINS

CROSS-REFERENCE TO RELATED APPLICATIONS

The present application claims priority to and is a continuation application of U.S. Provisional application Ser. No. 16/935,346, filed Jul. 22, 2020, the entire disclosure of which is expressly incorporated herein by reference.

GOVERNMENT SUPPORT

This invention was made with U.S. government ("Government") support under DE-AC02-06CH11357 awarded by the Department of Energy ("DOE"). The Government has certain rights in this invention.

TECHNICAL FIELD

The present disclosure generally relates to online power management for hybrid powertrains. More specifically, some embodiments of the present disclosure relate to brake thermal efficiency (BTE) determinations to be used in online power management for hybrid powertrains.

BACKGROUND

Recently, there has been an increased demand for vehicles with hybrid powertrains, e.g., hybrid vehicles with multiple forms of motive power, to meet criteria such as improved fuel economy and reduced emissions, while maintaining optimal performance for the user. Some hybrid powertrains include an engine (e.g., internal combustion engine), motor/generator(s) and battery(s). The engine can produce drive torque that is transferred to the hybrid drivetrain and charge the battery(s). When the battery(s) is(are) sufficiently charged, the hybrid powertrain can operate using the motor/generator(s) powered by the battery(s) without using the engine. Some hybrid powertrains include a hybrid architecture such that the engine can be decoupled from the wheels. It is possible to operate the engine at speeds and torques independent from what is demanded by the traction motor.

SUMMARY

At least some embodiments of the present disclosure are directed to determining the optimal BTE operating conditions of the engine online, to account for changes in engine efficiency because of operational uncertainties including, but not limited to, fuel quality, altitude and exhaust backpressure. As used herein, optimal BTE operating conditions refer to operating conditions corresponding to selected BTEs, where each selected BTE is selected based on a set of criteria. At least some embodiments of the present disclosure are directed to adjusting the online power management based on the optimal BTE operating conditions. As used herein, online power management refers to adjusting the power-split when a power system is in operation.

Spark-ignited engines are typically more efficient at higher loads because of lower pumping losses incurred by the intake air throttle. However, the net engine efficiency also depends on susceptibility to knock at high loads, as delayed in-cylinder combustion phasing to avoid knocking results in lower closed cycle efficiency. Additionally, the net engine efficiency depends on the combined effect of throttling and knocking, both of which can vary over time as a result of changes in, for example, fuel quality that affects knocking, in-cylinder dilution that affects both knocking and pumping efficiency, and exhaust backpressure that affects pumping efficiency and in-cylinder dilution. At least some embodiments of the present disclosure are directed to improving hybrid powertrain efficiency by detecting BTE operating conditions periodically and during vehicle operation, to adjust power management.

At least some embodiments of the present disclosure are directed to a method of online power management for a hybrid powertrain. The method includes the steps of: receiving, by a controller comprising one or more processors, measurement data when the hybrid powertrain is in operation, the measurement data comprising fuel flow rate data; pausing, by the controller, a power management of the hybrid powertrain; operating, by the controller, the hybrid powertrain at a plurality of speeds for a plurality of designated power levels; determining, by the controller, a plurality of brake-thermal-efficiencies (BTEs), each BTE of the plurality of BTEs being determined for one of the plurality of designated power levels at one of the plurality of speeds; and selecting, by the controller, a BTE from the plurality of BTEs with a corresponding speed for each of the plurality of designated power levels.

At least some embodiments of the present disclosure are directed to a system of online power management for a hybrid powertrain. The system includes one or more memories having instructions and one or more processors configured to execute the instructions to perform operations. The operations comprise: receiving measurement data when the hybrid powertrain is in operation, the measurement data comprising fuel flow rate data; pausing a power management of the hybrid powertrain; operating the hybrid powertrain at a plurality of speeds for a plurality of designated power levels; determining a plurality of brake-thermal-efficiencies (BTEs), each BTE of the plurality of BTEs being determined for one of the plurality of designated power levels at one of the plurality of speeds; and selecting a BTE from the plurality of BTEs with a corresponding speed for each of the plurality of designated power levels.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein:

FIG. 3A is a table illustrating example sets of BTEs and corresponding operating conditions determined in multiple estimation procedures; FIG. 3D shows illustrative examples of selected BTE operation conditions.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, when an element, component, device or layer is described as being "on" "connected to," "coupled to" or "in contact with" another element, component, device or layer, it can be directly on, directly connected to, directly coupled with, in direct contact with, or intervening elements, components, devices or layers may be on, connected, coupled or in contact with the particular element, component or layer, for example. When an element, component, device or layer for example is referred to as being "directly on," "directly connected to," "directly coupled to," or "directly in contact with" another element, component, device or layer, there are no intervening elements, components, devices or layers for example.

Although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," "series" or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

Figure 1A:
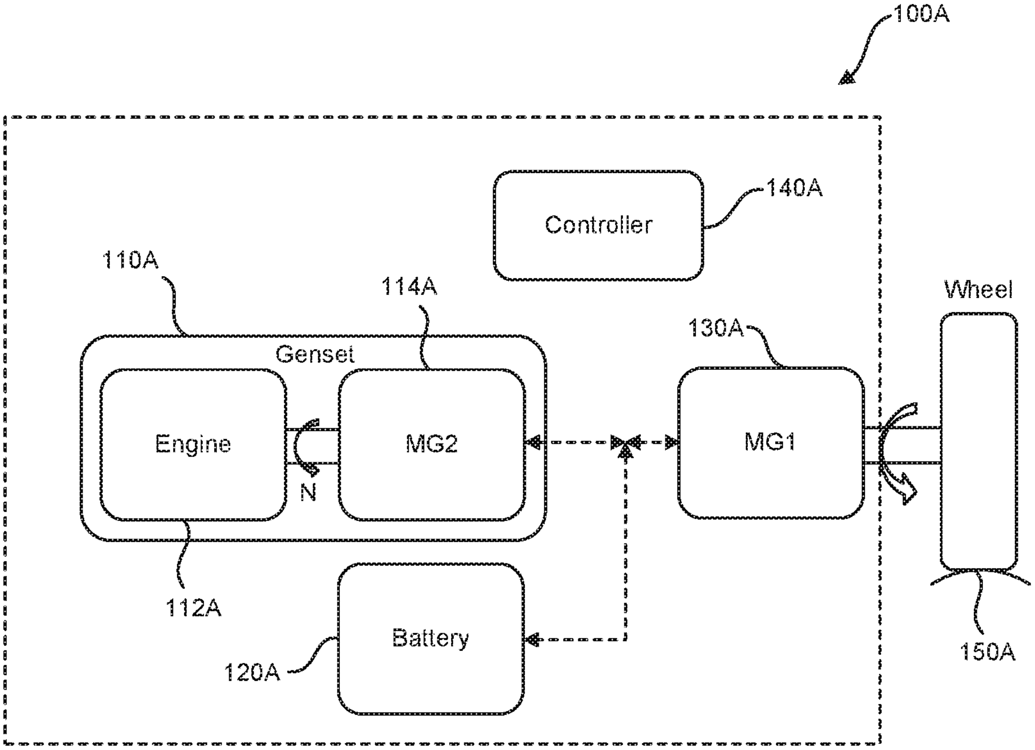
FIG. 1A depicts an illustrative diagram of a hybrid powertrain, in accordance with embodiments of the subject matter of the disclosure.

FIG. 1A depicts an illustrative diagram of a hybrid powertrain 100A, in accordance with embodiments of the subject matter of the disclosure. The hybrid powertrain 100A includes a generator set 110A. As used herein, a generator set, or referred to as a genset, refers to an equipment or a set of equipment generating power/energy. A genset can serve as the main source of power/energy or as a supplementary source of power/energy. In the example illustrated, the genset 110A includes an engine 112A and a motor generator 114A. The hybrid powertrain 100A further includes a battery 120A, a motor generator 130A, and a controller 140A. In some designs, the motor generator 130A is configured to provide traction power to wheels 150A of a vehicle. In this example, the genset speed can be set independently of the vehicle speed, to which the hybrid powertrain is to provide power. In some cases, the controller 140A is configured to receive a plurality of hybrid powertrain operational parameters such as, for example, current speed, current power level of the engine, the battery state-of-charge (SOC), and/or the like. In some cases, the controller 140A is configured to control the operation of the powertrain such as, for example, by setting the power level of the engine, setting the speed of the engine, and/or the like. In some embodiments, the hybrid powertrain 100A is configured to receive a vehicle power request and distribute power from a combination of the genset 110A and the battery 120A in response to the power request. In some cases, when the genset 110A produces more power than requested, the extra power is used to charge the battery 120A.

In some embodiments, the controller 140A is configured to conduct a brake-thermal-efficiency (BTE) estimation procedure when the hybrid powertrain 100A is in operation, for example, to optimize the power management of the hybrid powertrain 100A. The BTE estimation procedure is initiated when a predefined set of powertrain boundary conditions are met. In some cases, the engine 112A is operated in a quasi-steady state at different speeds, with varying torque requests at each speed up to the torque curve. The actual torque of the engine can be measured using electrical output from the inverter (not shown), to which the generator set 110A is coupled in this powertrain architecture. Changes in the requested engine torque are quasi-static to ensure accuracy in air-fuel-ratio (AFR) control, air handling controls, knock control as well as accurate torque feedback from the inverter. In some cases, the fuel quantity (estimated from injector ON time) is recorded during each torque sweep and converted to BTE using speed and torque feedback from the inverter. In some cases, the operating condition (e.g., speed and torque) yielding the highest BTE at each power level, referred to as the optimal BTE operating condition, is determined and used to adjust the powertrain energy management strategy. This procedure can be repeated periodically, during normal vehicle operation, to ensure continued optimal powertrain operation, for example.

Figure 1B:
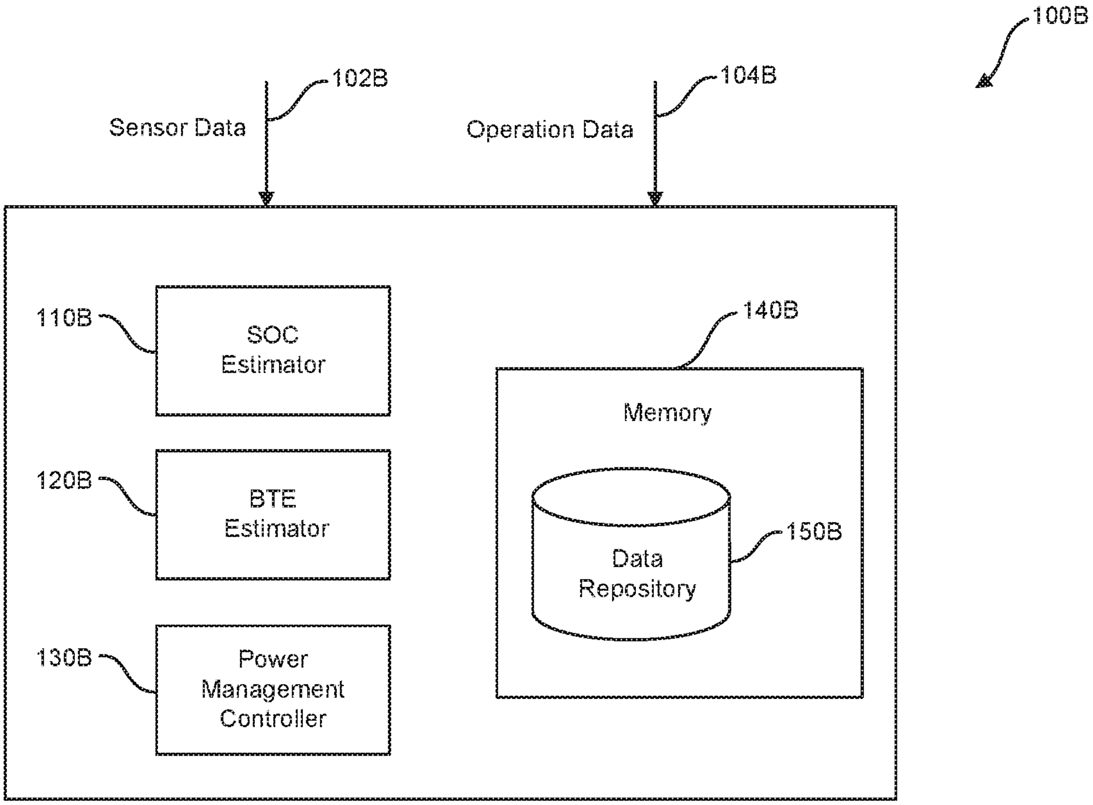
FIG. 1B depicts an illustrative design diagram for a hybrid powertrain controller, in accordance with embodiments of the subject matter of the disclosure.

FIG. 1B depicts an illustrative design diagram for a hybrid powertrain controller 100B, in accordance with embodiments of the subject matter of the disclosure. The controller 100B is configured to implement any embodiments of processes described in the present disclosure herein. In this example, the hybrid powertrain controller 100B includes an SOC estimator 110B, a BTE estimator 120B, a power management controller 130B and a memory 140B. In some embodiments, the controller 100B receives sensor data 102B and operation data 104B. In some cases, the sensor data 102B and the operation data 104B are collectively referred to as measurement data. The SOC estimator 110B is configured to determine a state of charge (SOC) of the battery (e.g., battery 120A in FIG. 1A) of the hybrid powertrain. In some cases, the SOC estimator 110B is integrated with (e.g., as a software/hardware module) the controller 100B. In some cases, the SOC estimator 110B is external to the controller 100B and coupled to the controller 100B.

In some embodiments, the power management controller 130B is configured to pause a current power management or send a command to pause the current power management, set the power level of the hybrid powertrain, and optionally adjust the power management based on the optimal BTE operating conditions. In some cases, the power management controller 130B is integrated with (e.g., as a software/hardware module) the controller 100B. In some cases, the power management controller 130B is external to the controller 100B and coupled to the controller 100B. In some cases, the memory 140B includes a data repository 150B, for example, to store the sensor data, the operation data, the predetermined speeds and/or power levels for the BTE estimation procedure, the SOC predetermined threshold and/or range, the SOC, the BTE estimations, the BTE operating conditions, the optimal BTE operating conditions, and/or the like. As used herein, an optimal BTE operating condition refers to an optimal or selected BTE at a given power level with a corresponding hybrid powertrain operating condition (e.g., a corresponding speed and/or torque).

The BTE estimator 120B is configured to conduct the BTE estimation procedure and determine optimal BTE operating conditions. In some embodiments, the BTE estimator 120B is configured to receive sensor data 102B, operation data 104B, and/or data from the SOC estimator 110B to determine whether a trigger event (e.g., a refuel event) has occurred and/or a set of prerequisite conditions are met. The trigger event can be a refuel event, an operation state, a timing event, other trigger events, and/or a combination thereof. The timing event, in one example, is an input or a configuration on how often a BTE estimation procedure can be performed. In one example, the trigger event can be a refuel event in combination with timing requirement (e.g., the BTE estimation procedure cannot be conducted more often than once a day).

In some cases, after the trigger event occurs, the BTE estimator 120B evaluates the prerequisite conditions including, for example, an SOC proximate to a predetermined threshold (e.g., 50% of a maximum SOC), the operating state of the hybrid powertrain suitable for conducting the BTE estimation procedure, other prerequisite conditions, and any combination thereof. As one example, the SOC is proximate to a predetermined threshold when the SOC is at the predetermined threshold or within 5% deviation from the predetermined threshold. As another example, the SOC is proximate to a predetermined threshold when the SOC is at the predetermined threshold or within 10% deviation from the predetermined threshold. When or in response to the prerequisite conditions being met, the BTE estimator 120B is configured to send out a signal to pause the online power management of the hybrid powertrain. In one example, the prerequisite SOC condition is to evaluate whether the SOC is proximate to a predetermined threshold, such that the SOC is in an acceptable range (e.g., 10-90% of a maximum SOC) during the BTE estimation procedure, such that the SOC is not over drained or over charged. In one embodiment, the signal to pause is received by the power management controller 130B and in response to the received signal, the controller 130B pauses the online power management.

In some embodiments, the BTE estimator 120B is configured to, optionally via the power management controller 130B or other components, operate the hybrid powertrain at a plurality of speeds for a plurality of designated power levels. In some cases, the BTE estimator 120B is configured to set the engine at a specific speed or send out a comment to set the engine at a specific speed. In some cases, the BTE estimator 120B is configured to determine and send a plurality of torques requests, each for a designated power level, to the hybrid powertrain. The BTE estimator 120B is configured to determine and store a plurality of BTEs and BTE operating conditions for a specific power level. In some implementations, the BTE estimator 120B is configured to determine each of the plurality of BTEs for a specific power level when the hybrid powertrain is at a steady state.

As used herein, the steady state of a hybrid powertrain refers to a plurality of predetermined criteria being met, where the plurality of predetermined criteria includes, for example, a lambda control criteria, a knock control criteria, a fueling estimate criteria, and an engine torque feedback criteria, and/or the like. In some cases, the steady state refers a respective parameter having a deviation within a predefined bound for at least a predefined duration (e.g., a duration between 5-10 seconds). In some embodiments, a lambda control criteria refers to maintaining error in engine-out excess air ratio (lambda), which can be measured using an engine-out universal exhaust gas oxygen (UEGO) sensor, within predefined bounds continuously for a predefined duration.

In some embodiments, a knock control criteria refers to achieving knock index lower than a predefined threshold and spark timing variation within a predefined threshold continuously for a predefined duration. In some cases, the knock index can be determined using data measured by knock sensors. In some embodiments, the fueling estimate criteria refers to ensuring that variation in fueling estimate or injector ON time is below a predefined threshold continuously for a predefined duration. Further, the steady state may include an engine torque feedback criteria, which ensures the variation in torque feedback is below a predefined threshold continuously for a predefined duration. In some cases, the torque feedback is measured using the inverter.

In some embodiments, the BTE estimator 120B is configured to select a BTE from the plurality of BTEs with a corresponding speed and/or a corresponding torque for a designated power level, which can be designated as an optimal BTE operating condition. The selected BTE can be selected by one or more criteria. In some cases, the selected BTE is a highest BTE value of a plurality of BTE estimations for the designed power level. In some cases, the BTE estimator 120B applies a function (e.g., (e.g., smooth function, moving average, weighted moving average) to the plurality of BTEs for a designated power level. In one embodiment, the BTE estimator 120B is configured to select a BTE with a correspond speed and/or torque from the plurality of processed BTEs.

In some cases, the power management controller 130B is configured to adjust the power management based on selected BTEs operating conditions. In some cases, the BTE operating conditions with selected BTEs and corresponding speeds and/or torques are stored in the data repository 150B. In some cases, the optimal BTE operating conditions with selected BTEs with corresponding speeds and/or torques are transmitted to a software/hardware module external to the hybrid powertrain controller 100B to adjust the power management.

In some embodiments, a computing device (e.g., the controller 100B, the SOC estimator 110B, the BTE estimator 120B, the power management controller 130B) includes a bus that, directly and/or indirectly, couples the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in some embodiments, the computing device may include a number of processors, a number of memory components, a number of I/O ports, a number of I/O components, and/or a number of power supplies. Additionally, any number of these components, or combinations thereof, may be distributed and/or duplicated across a number of computing devices.

The hybrid powertrain controller 100B shown in FIG. 1B is not intended to suggest any limitation as to the scope of use or functionality of embodiments of the present disclosure. Neither should the hybrid powertrain controller 100B be interpreted as having any dependency or requirement related to any single component or combination of components illustrated therein. Additionally, various components depicted in FIG. 1B may be, in embodiments, integrated with various ones of the other components depicted therein (and/or components not illustrated), all of which are considered to be within the ambit of the subject matter disclosed herein. For example, the BTE estimator 120B may be integrated with the power management controller 130B.

In some embodiments, the memory 140B includes computer-readable media in the form of volatile and/or nonvolatile memory, transitory and/or non-transitory storage media and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like. In some embodiments, the memory 140B stores computer-executable instructions for causing a processor (e.g., the controller 100B, the SOC estimator 110B, the BTE estimator 120B, the power management controller 130B) to implement aspects of embodiments of system components discussed herein and/or to perform aspects of embodiments of methods and procedures discussed herein.

Computer-executable instructions may include, for example, computer code, machine-useable instructions, and the like such as, for example, program components capable of being executed by one or more processors associated with a computing device. Program components may be programmed using any number of different programming environments, including various languages, development kits, frameworks, and/or the like. Some or all of the functionality contemplated herein may also, or alternatively, be implemented in hardware and/or firmware.

The data repository 150B may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository 150B may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

Various components of the controller 100B can communicate via or be coupled to via a communication interface, for example, a wired or wireless interface. The communication interface includes, but is not limited to, any wired or wireless short-range and long-range communication interfaces. The wired interface can use cables, wires, and/or the like. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2A:
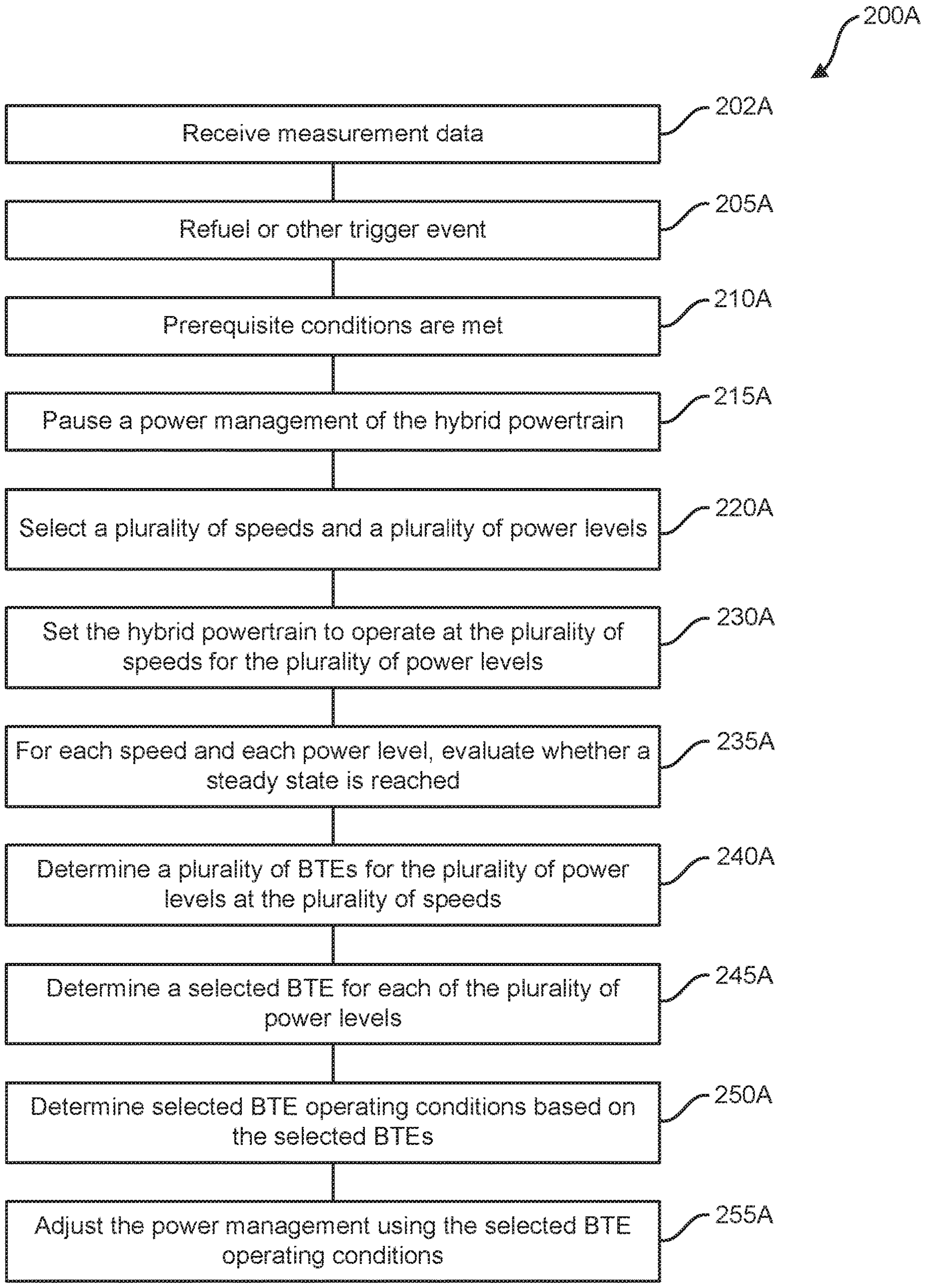
FIG. 2A is an example flow diagram depicting an illustrative method of online brake thermal efficiency (BTE) estimation and power management of a hybrid powertrain, in accordance with embodiments of the present disclosure.

FIG. 2A is an example flow diagram depicting an illustrative method 200A of online brake thermal efficiency (BTE) estimation and power management of a hybrid powertrain, in accordance with embodiments of the present disclosure. Aspects of embodiments of the method 200A may be performed, for example, by a controller for a hybrid powertrain (e.g., controller 140A in FIG. 1A, the controller 100B or the BTE estimator 210B in FIG. 1B). One or more steps of method 200A are optional and/or can be modified by one or more steps of other embodiments described herein. Additionally, one or more steps of other embodiments described herein may be added to the method 200A. First, the controller receives measurement data (e.g., the sensor data 102B and/or the operation data 104B in FIG. 1B) when the hybrid powertrain is in operation (202A). In some cases, the measurement data includes fuel flow rate data. In some cases, the measurement data include torque feedback data, lambda control data, fueling event, fueling estimate data, knock control data, and/or the like. Next, the controller receives an indication of an occurrence of the refuel or other trigger event(s) (205A). The BTE is often changed with variations in fuel quality, so running the BTE estimation procedure after each refuel may be desirable. On the other hand, the BTE estimation procedure is an intrusive testing procedure such that it should be conducted in a suitable operation state, for example, neither in a fast acceleration mode nor when the vehicle is driving up a steep hill.

Next, the controller of the hybrid powertrain is configured to evaluate whether prerequisite conditions are met (210A). The prerequisite conditions include, for example, a condition of the SOC of the battery (e.g., battery 120A in FIG. 1A), a condition of vehicle operations, and the like. When the prerequisite conditions are met, the controller may pause a power management of the hybrid powertrain (e.g., online power management) (215A) or send a command to pause the power management to start the BTE estimation procedure. During the procedure, the controller is configured to select a plurality of speeds and a plurality of power levels (220A). For example, the power levels are selected within the range of power levels (e.g., 0-150 kW) of the powertrain with discrete increments (e.g., 10 kW, 15 kW, etc.). In some cases, the plurality of speeds are predetermined. In some cases, the speeds and/or the power levels are selected based on inputs, for example, a user input, an input from another system, a system configuration, and the like. In some cases, the plurality of speeds, or referred to as the speed matrix, and/or the plurality of power levels, or referred to as the power level matrix, may be stored in a data repository (e.g., the data repository 150B in FIG. 1B). In some embodiments, the controller operates, or sends commands to cause to operate, the hybrid powertrain at the plurality of speeds for the plurality of power levels (230A).

In some cases, for each speed and each power level, the controller determines whether a steady state of the hybrid powertrain is reached (235A). The steady state refers to a plurality of predetermined criteria being met, where the one or more predetermined criteria comprises at least one of a lambda control criteria, a knock control criteria, a fueling estimate criteria, and an engine torque feedback criteria. In some cases, the steady state refers a respective parameter of the operation of the hybrid powertrain having a deviation within a predefined bound for a predefined duration (e.g., a duration between 5-10 seconds).

In some embodiments, the controller determines a plurality of BTEs at the plurality of speeds for the plurality of power levels (240A), for example, at a respective steady state of the hybrid powertrain. In some cases, the BTEs are determined after the steady state of the powertrain is reached. In one example, the BTE is determined using equation (1) below:

$$BTE = \frac{\text{Power Level}}{\text{Fuel Flow Rate} \times \text{Constant}}, \tag{1}$$

where Power Level is the power level of the genset, Fuel Flow Rate is the fuel flow rate of the engine, which can be measured by sensor(s) and/or controlled by the controller, and the Constant is the lower heating value of fuel, which is a constant value. The power level, also referred to as the brake power, in some cases, can be estimated as the speed multiplied by the torque. The controller is configured to determine a selected BTE with a corresponding speed for each of the plurality of power levels (245A). In some cases, the selected BTE is the maximum value of the plurality of BTEs determined for a power level. In some cases, the selected BTE is selected via one or more criteria. In some cases, the selected BTE is selected from a set of generated values by applying a function (e.g., smooth function, moving average, weighted moving average) to the plurality of BTEs. In one example, the selected BTE is the highest value of the set of generated values by applying the function to the plurality of BTEs.

Figure 3B:
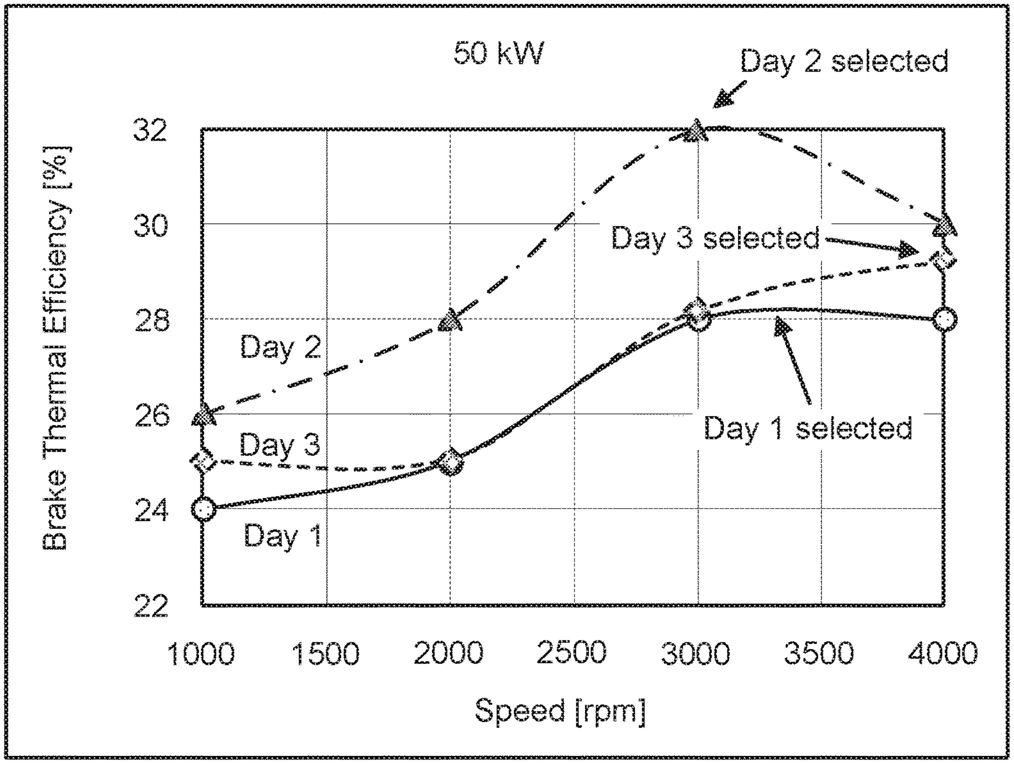
FIGS. 3B and 3C are graphs of illustrative examples of BTE changes in different estimation procedures for a respective power level.
Figure 3C:
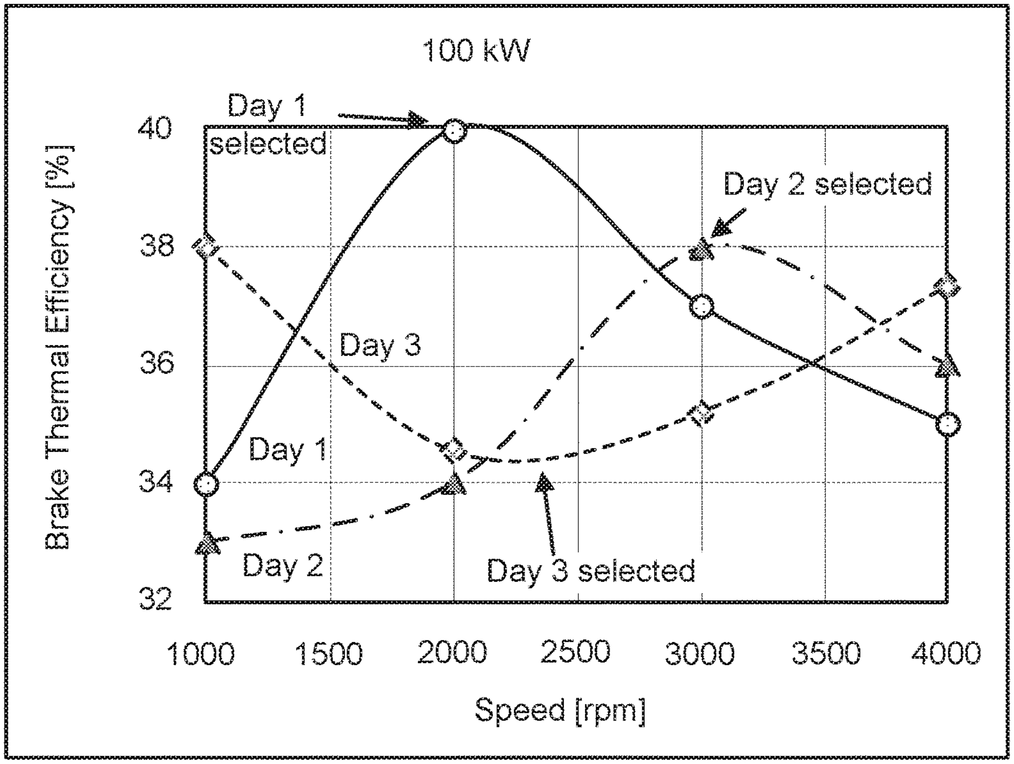

In some embodiments, the controller of the hybrid powertrain is configured to determine selected BTE operating conditions based on the selected BTEs (250A), where the BTE operating conditions include a plurality of selected BTEs, each with a corresponding operating condition (e.g., a corresponding speed and/or torque) of the hybrid powertrain for the selected BTE. FIG. 3A is a table of illustrative examples of BTEs and corresponding operating conditions determined in multiple estimation procedures (e.g., test sets of Day 1, Day 2, and Day 3); FIGS. 3B and 3C are graphs of illustrative examples of BTE changes in different estimation procedures (e.g., test sets of Day 1, Day 2, and Day 3) for a respective power level; and FIG. 3D shows illustrative examples of optimal BTE operating conditions. In this example, an individual BTE estimation procedure is conducted for each day (e.g., day 1, day 2, day 3). As illustrated in FIG. 3B, for the power level of 50 kW, day 1's optimal BTE is at the speed of 1800 rotation-per-minute ("rpm") and the torque of 265 Newton-meter ("Nm"), day 2's optimal BTE is at the speed of 2000 rpm and the torque of 239 Nm, and day 3's optimal BTE is at the speed of 1000 rpm and the torque of 477 Nm. As illustrated in FIG. 3C, for power level 100 kW, day 1's optimal BTE is at the speed of 2000 rpm and the torque of 477 Nm, day 2's optimal BTE is at the speed of 3000 rpm and the torque of 318 Nm, and day 3's optimal BTE is at the speed of 2300 rpm and the torque of 415 Nm. The speed and the torque of the BTE operating conditions shown in the table of FIG. 3D are corresponding to the optimal/selected BTEs operating conditions for corresponding power levels.

Referring back to FIG. 2A, in some embodiments, the controller adjusts the power management using the selected BTE operating conditions (255A). In one embodiment, the power management adjustment is completed online, for example, when the hybrid powertrain is in operation. In some cases, the controller transmits the optimal/selected BTE operating conditions to a different engine control unit to cause the adjustment of power management. In some cases, the controller stores the BTE operating conditions in a data repository.

Figure 2B:
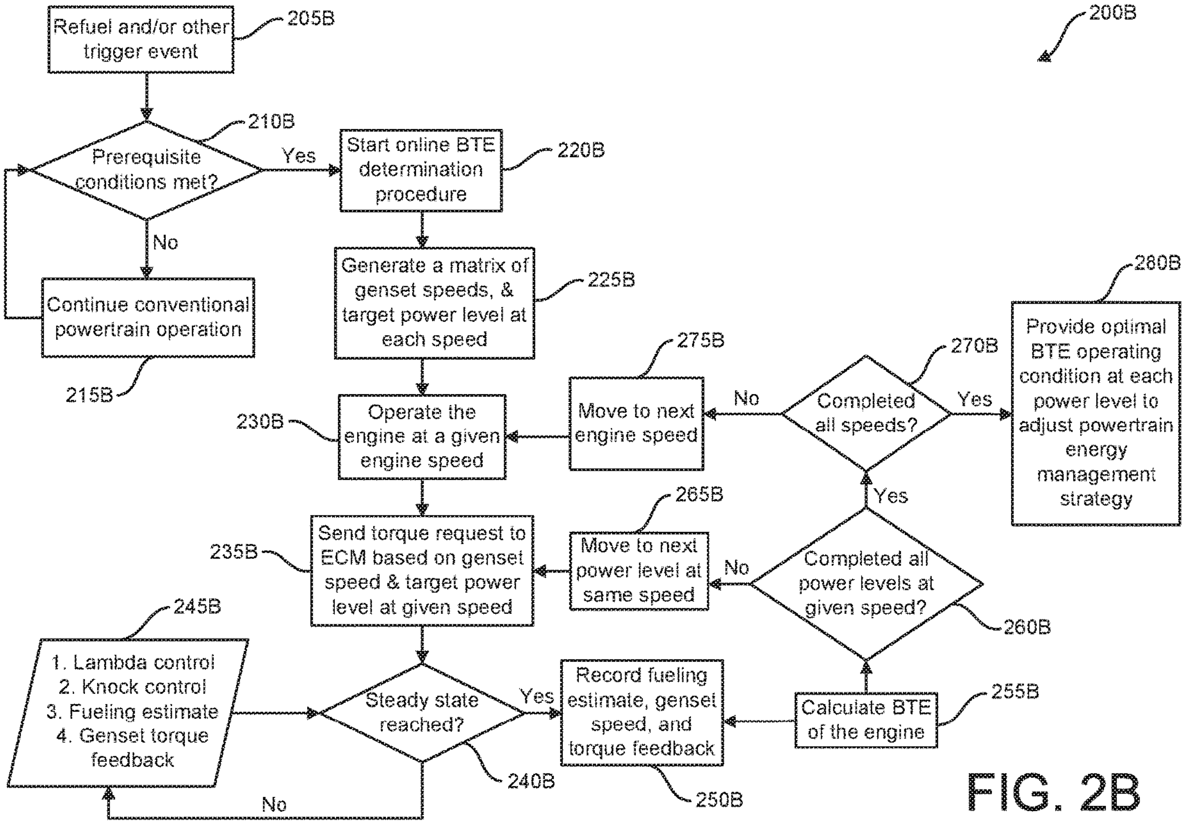
FIG. 2B is an example flow diagram depicting an illustrative method 200B of online brake thermal efficiency (BTE) estimation and power management of a hybrid powertrain, in accordance with embodiments of the present disclosure.

FIG. 2B is an example flow diagram depicting an illustrative method 200B of online optimal brake thermal efficiency (BTE) operating condition determinations and power management of a hybrid powertrain, in accordance with embodiments of the present disclosure. Aspects of embodiments of the method 200B may be performed, for example, by a system (e.g., hybrid powertrain 100A in FIG. 1A), a controller (e.g., the controller 140A in FIG. 1A, the hybrid powertrain controller 100B). One or more steps of method 200B are optional and/or can be modified by one or more steps of other embodiments described herein. Additionally, one or more steps of other embodiments described herein may be added to the method 200B. First, the controller of the hybrid powertrain receives an indication of an occurrence of a refuel event and/or other trigger event(s) (e.g., a timing event) (205B).

Figure 4:
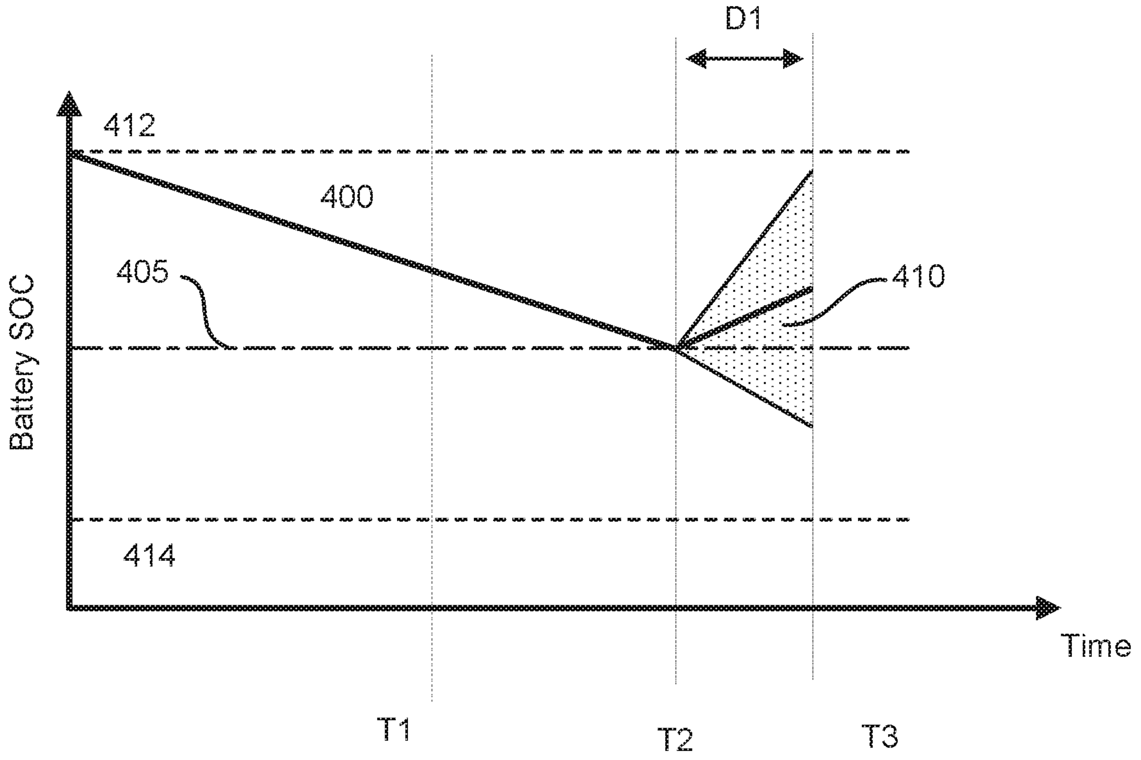
FIG. 4 is an illustrative example showing state-of-charge (SOC) of the battery of the hybrid powertrain before and during the BTE estimation.

Next, the controller evaluates whether prerequisite condition(s) is(are) met (210B). In some embodiments, the prerequisite condition(s) includes a condition of the hybrid powertrain at a suitable operation mode, for example, not during a fast acceleration. In some embodiments, the prerequisite condition includes a condition of an SOC of the battery in the hybrid powertrain proximate to a predetermined threshold. In some embodiments, the prerequisite condition includes a condition of an SOC of the battery in the hybrid powertrain within a predetermined range (e.g., 95%-105% of a predetermined threshold). The predetermined threshold is selected at a value or a range of values such that the battery will not be over drained or over charged during the BTE estimation procedure. FIG. 4 is an illustrative example showing SOC before and during the BTE estimation procedure. The waveform 400 represents an example of changes of SOC over time. At T1, the refuel event and/or other trigger event(s) have occurred and one or more prerequisite conditions have been met. In this example, the SOC is decreasing toward the SOC threshold 405. At T2, the SOC predetermined threshold 405 is met and the BTE estimation procedure starts. In certain embodiments, the BTE estimation procedure starts when the power management is paused. During the BTE estimation procedure (e.g., during D1), if the genset (e.g., the geneset 110A in FIG. 1A)

power is greater than the vehicle demanded power, the genset power is used to charge the battery (e.g., the battery 120A in FIG. 1A); and if the genset power is lower than the vehicle demanded power, the battery provides the remainder of the demanded power. Therefore, in this example, the SOC is within a range 410 during the BTE estimation procedure between T2 and T3, where the range 410 is within the upper operational SOC bound 412 (e.g., 90% of a maximum SOC) and the lower operational SOC bound 414 (e.g., 20% of a maximum SOC).

Referring back to FIG. 2B, if the prerequisite conditions are not met, the hybrid powertrain will continue with conventional powertrain operation based on existing power management (215B). If the prerequisite conditions are met, the controller will start the online BTE estimation/determination procedure (220B). During the BTE estimation procedure, the controller can generate and/or use a matrix of genset speeds and target power levels at each speed (225B). In some cases, the matrix of genset speeds and target power levels is stored in a data repository (e.g., the data repository 150B in FIG. 1B). In some cases, the specific power level is selected from a set of predetermined power levels, for example, a set of power levels between 0-150 KW with a 15 KW increment. The controller may operate the engine at a given engine speed (230B), for example, using a speed in the matrix. Next, the controller may send a torque request to an engine control module (ECM), where the torque request is determined based on the genset speed and a target power level (235B). In one example, the torque request is set using the equation (2) below:

$$\text{Brake Power}=\text{Speed}\times\text{Torque} \quad (2),$$

where Brake Power is the target power level, Speed is the genset speed, and Torque is the torque request.

After the torque request is sent, in some embodiments, the controller is configured to evaluate whether a steady state of the hybrid powertrain is reached (240B). In some cases, the steady state of the hybrid powertrain comprises one or more predetermined criteria being met. In some cases, the one or more predetermined criteria comprises at least one of a lambda control criteria, a knock control criteria, a fueling estimate criteria, and a genset/engine torque feedback criteria. If the steady state is not reached, the controller proceeds to the next set of operating conditions (245B). In some cases, if the steady state is reached, the controller records the fueling estimate, the genset speed, and the torque feedback (250B). The controller is further configured to calculate BTE of the engine (255B). In one example, the BTE is determined using equation (1).

In some embodiments, the controller is configured to determine whether BTE estimations are completed for all power levels at a given speed (260B). If the BTE estimations for a speed have not completed, the controller is configured to move to the next power level (e.g., a next power level in the power level matrix) at the same speed (265B) and configured to send torque requests for the next power level and speed (235B). If the BTE estimations for a speed have completed, the controller checks whether BTE estimations are completed for all speeds (270B). If the BTE estimations are not completed for all speeds, for example, the speeds in the engine speed matrix, the controller moves to next engine speed (275B), and operates the engine or sends a command to operate the engine at the next engine speed ((e.g., a next speed in the speed matrix)) (230B). If the BTE estimations are completed for all speeds, the controller may provide an optimal BTE operating condition for each of the plurality of target power levels to adjust a powertrain energy/power management strategy (280B). In some embodiments, the optimal BTE operating condition includes a highest value of BTE for each power level with corresponding speed and torque.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A method of online power management for a hybrid powertrain, the method comprising:

pausing, by a controller comprising one or more processors, a power management of the hybrid powertrain when the hybrid powertrain is in operation; and when the power management of the hybrid powertrain is paused, operating during a first time period, by the controller, the hybrid powertrain at a first speed of a plurality of speeds at a first designated power level of a plurality of designated power levels;

sending a first torque request determined based on the first speed and the first designated power level;

receiving, by the controller, a first set of measurement data collected during the first time period when the hybrid powertrain is operated at the first speed at the first designated power level at a steady state, the first set of measurement data comprising fuel flow rate data, wherein the steady state comprises a predetermined criteria being met, and wherein the predetermined criteria comprises an engine torque feedback criteria, the predetermined criteria having a deviation within a predefined bound for at least a predefined duration; and determining, by the controller, a first brake-thermal-efficiency (BTE) of a plurality of brake-thermal-efficiencies (BTEs) based on the first set of measurement data, wherein each BTE of the plurality of BTEs is determined using a ratio of electrical power output by a generator of the hybrid powertrain to a fuel flow rate of an engine of the hybrid powertrain.

2. The method of claim 1, further comprising:

selecting, by the controller, a BTE from the plurality of BTEs for the first designated power level of the plurality of designated power levels, the selected BTE corresponding to a speed.

3. The method of claim 2, further comprising:

adjusting, by the controller, the power management based on the selected BTE with the corresponding speed for the first designated power level of the plurality of designated power levels.

4. The method of claim 2, wherein the selected BTE is a maximum value of the plurality of BTEs for the first designated power level of the plurality of designated power levels.

5. The method of claim 1, further comprising:

when the power management of the hybrid powertrain is paused, operating during a second time period different from the first time period, by the controller, the hybrid powertrain at a second speed of the plurality of speeds for a second designated power level of a plurality of designated power levels, the second speed being different from the first speed, the second designated power level being different from the first designated power level;

sending a second torque request determined based on the second speed and the second designated power level;

receiving, by the controller, a second set of measurement data collected during the second time period when the hybrid powertrain is operated at the second speed at the second designated power level at the steady state, the second set of measurement data comprising fuel flow rate data; and determining, by the controller, a second BTE of a plurality of second BTEs based on the second set of measurement data.

6. The method of claim 1, further comprising:

receiving, by the controller, an indication of a refueling event; and wherein pausing a power management comprises pausing the power management after receiving the indication of a refueling event.

7. The method of claim 1, further comprising:

evaluating, by the controller, one or more prerequisite conditions; and wherein pausing a power management further comprises pausing the power management after the one or more prerequisite conditions are met.

8. The method of claim 7, wherein the one or more prerequisite conditions comprise a state-of-charge (SOC) of a battery of the hybrid powertrain proximate to a predetermined threshold.

9. The method of claim 1, wherein pausing a power management comprises sending a command to pause the power management of the hybrid powertrain.

10. The method of claim 1, wherein the predefined duration is between 5-10 seconds.

11. The method of claim 1, wherein the predetermined criteria further comprises a lambda control criteria.

12. The method of claim 11, wherein the predetermined criteria further comprises at least one of a knock control criteria and a fueling estimate criteria.

13. A system of online power management for a hybrid powertrain, the system comprising:

one or more memories having instructions; and one or more processors configured to execute the instructions to perform operations comprising:

pausing a power management of the hybrid powertrain when the hybrid powertrain is in operation;

when the power management of the hybrid powertrain is paused:

operating the hybrid powertrain at a first speed of a plurality of speeds at a first designated power level of a plurality of designated power levels during a first time period;

sending a first torque request determined based on the first speed and the first designated power level;

receiving a first set of measurement data collected during the first time period when the hybrid powertrain is operated at the first speed at the first designated power level at a steady state, the first set of measurement data comprising fuel flow rate data, wherein the steady state comprises a predetermined criteria being met, and wherein the predetermined criteria comprises an engine torque feedback criteria, the predetermined criteria having a deviation within a predefined bound for at least a predefined duration; and determining a first brake-thermal-efficiency (BTE) of a plurality of brake-thermal-efficiencies (BTEs) based on the first set of measurement data, wherein each BTE of the plurality of BTEs is determined using a ratio of electrical power output by a generator of the hybrid powertrain to a fuel flow rate of an engine of the hybrid powertrain.

14. The system of claim 13, wherein the operations further comprise:

selecting a BTE from the plurality of BTEs for the first designated power level of the plurality of designated power levels, the selected BTE corresponding to a speed.

15. The system of claim 14, wherein the operations further comprise:

adjusting the power management based on the selected BTE with the corresponding speed for the first designated power level of the plurality of designated power levels.

16. The system of claim 14, wherein the selected BTE is a maximum value of the plurality of BTEs for a corresponding power level.

17. The system of claim 13, wherein the operations further comprise:

when the power management of the hybrid powertrain is paused, operating the hybrid powertrain at a second speed of the plurality of speeds at a second designated power level of a plurality of designated power levels during a second time period different from the first time period, the second speed being different from the first speed, the second designated power level being different from the first designated power level;

sending a second torque request determined based on the second speed and the second designated power level;

receiving a second set of measurement data collected during the second time period when the hybrid powertrain is operated at the second speed at the second designated power level at the steady state, the second set of measurement data comprising fuel flow rate data; and determining a second BTE of the plurality of BTEs based on the second set of measurement data.

18. The system of claim 13, wherein the operations further comprise:

receiving an indication of a refueling event; and wherein pausing a power management comprises pausing the power management after receiving the indication of a refueling event.

19. The system of claim 13, wherein the operations further comprise:

evaluating one or more prerequisite conditions; and wherein pausing a power management further comprises pausing the power management after the one or more prerequisite conditions are met.

20. The system of claim 19, wherein the one or more prerequisite conditions comprise a state-of-charge (SOC) of a battery of the hybrid powertrain proximate to a predetermined threshold.

21. The system of claim 13, wherein pausing a power management comprises sending a command to pause the power management of the hybrid powertrain.

22. The system of claim 13, wherein the plurality of designated power levels comprise a base power level and a set of incremental values having a constant increment between two adjacent power levels.

23. The system of claim 13, wherein the predefined duration is between 5-10 seconds.

* * * * *